United States Patent [19]

Early

[11] 3,921,123
[45] Nov. 18, 1975

[54] TORPEDO TARGET SIMULATOR
[75] Inventor: Edward W. Early, Seattle, Wash.
[73] Assignee: The United States of America as represented by the Secretary of the Navy, Washington, D.C.
[22] Filed: Feb. 2, 1967
[21] Appl. No.: 614,531

[52] U.S. Cl. .................................. 340/3 E; 340/5 D
[51] Int. Cl. .............................................. G01s 9/66
[58] Field of Search ........ 340/3 E, 3 S, 5 D; 325/11

[56] References Cited
UNITED STATES PATENTS
2,228,815  1/1941  Deerhake .......................... 325/11
2,882,394  4/1959  Mortley .......................... 325/11 X
2,975,396  3/1961  Mueller ................................ 340/5
3,164,659  1/1965  Abrams ............................. 35/10.4

OTHER PUBLICATIONS
Albers, Underwater Acoustics Handbook, 1965, pp. 250–252 relied on.

Primary Examiner—Richard A. Farley
Attorney, Agent, or Firm—R. S. Sciascia; G. Rubens; A. Branning

[57] ABSTRACT

A target simulator which shifts the frequency of a received signal and retransmits it to the sending station to simulate doppler shift having a first converter transducer which mixes the received signal with the output of a first oscillator and passes the signal to a bandpass filter which filters out all signals except the one having a frequency equal to the sum of the received signal and the first oscillator and passes the signal to a second converter transducer which mixes the signal with the output of a second oscillator the frequency of which is removed from the first oscillator by the desired doppler shift. The output is transmitted through a low pass filter which filters out all signals except the one having a frequency equal to that of the initially received signal plus that of the first oscillator minus that of the second oscillator.

5 Claims, 1 Drawing Figure

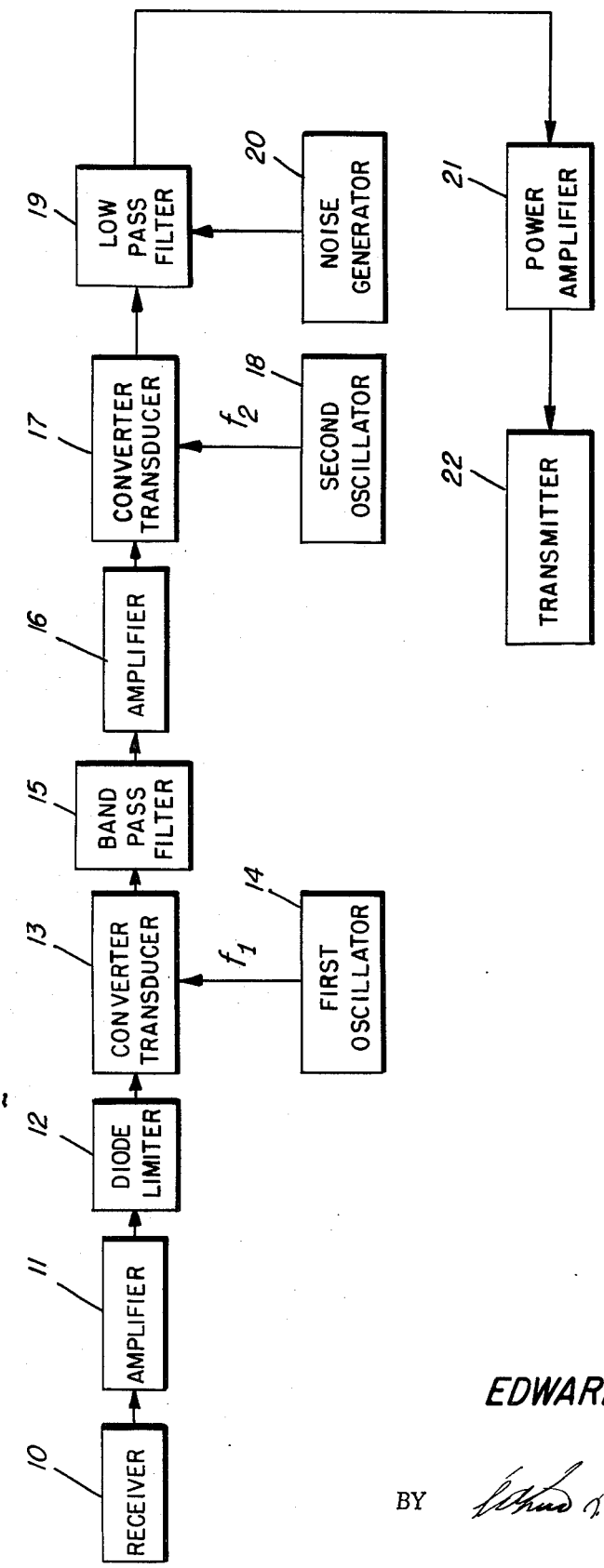

TORPEDO TARGET SIMULATOR

The present invention relates to a target simulator and, more particularly, to a device for receiving a sonar signal and returning an echo signal, the frequency of which is shifted by a predetermined amount to simulate doppler shift.

Sonar systems commonly employ the doppler effect to detect the presence of moving targets. The doppler effect causes a signal sent out by a sonar system and reflected by a moving target to be shifted in frequency by an amount equal to $$f_d = \frac{2v_r}{\lambda}$$

where
- $f_d$ = doppler frequency shift
- $v_r$ = relative velocity between the sonar and the target
- $\lambda$ = wave length of the signal picked up by the sonar system The continuous improvement of torpedoes has necessitated the development of improved target simulators. Prior art target simulators generally employ a low frequency signal source, the output of which is mixed in a converter with the signal received from the sonar system. A converter is a device which generates signals having frequencies equal to those of the input signals as well as a signal having a frequency equal to the sum of the frequencies of the input signals and a signal having a frequency equal to the difference between the frequencies of the input signals. The signals are passed through a filter which has a predetermined bandpass which is designed to filter out all signals except either the signal having a frequency equal to the sum of the frequencies of the input signals or the signal having a frequency equal to the difference between the frequencies of the input signals. The signal passed through the filter is the desired simulated echo signal, the frequency of which is shifted by the desired number of cycles in order to simulate doppler frequency shift. Such prior art devices have the disadvantage of requiring a change of filter whenever the frequency of operation is changed.

The general purpose of the present invention is to provide a target simulator which embraces all the advantages of similarly employed prior art devices and does not possess the aforedescribed disadvantages. To attain this, the present invention contemplates the use of two oscillators having frequencies which differ by the desired doppler frequency shift.

According to one embodiment of the present invention, in order to increase the frequency of a sonar signal, the signal received by the simulator is mixed in a converter with the output of the first oscillator. A bandpass filter filters out all of the signals which are generated by the converter except for the signal having a frequency equal to the sum of the frequencies of the received signal and the first oscillator signal. The output of the bandpass filter is then mixed in a second converter with the output of the second oscillator having a frequency which is less than that of the first oscillator by the desired frequency shift. The output of the second converter is then passed through a low pass filter which filters out all signals except for the signal having a frequency equal to the frequency of the received signal plus the difference between the frequencies of the first and second oscillators. In addition, the output of a noise generator is passed through the low pass filter to simulate machinery and propeller noise. The resultant signal having a frequency equal to the frequency of the received signal plus the difference between the frequencies of the first and second oscillators, plus noise, is retransmitted to the sending sonar unit.

Accordingly, an object of the present invention is to provide means to simulate a sonar target.

Another object of the present invention is to provide means to change the frequency of a received signal by a predetermined amount.

Another object of the present invention is to provide means to simulate the doppler shift of a moving target.

A further object of the present invention is the provision of means to simulate a target which can accommodate sonar frequencies over a wider range than prior art devices without changing the target circuit components.

Other objects, advantages and novel features of the present invention will become apparent from the following detailed description of the invention when considered in conjunction with the accompanying drawing wherein:

The FIGURE illustrates an embodiment of the present invention which is operative to increase the frequency of a received signal by a predetermined amount.

Referring now to the FIGURE, a receiver 10 of the target simulator receives signals from a sonar system, not shown, and passes them to amplifier 11 which amplifies the signals and passes them to diode limiter 12. Diode limiter 12 clips high voltage signals which it receives from amplifier 11 in order to prevent overloading of the succeeding circuits. The output of diode limiter 12 is fed to a conventional convereter 13. The output of a first oscillator 14 having a frequency equal to $f_1$ is also fed to the converter.

Converter 13 generates four signals. A first signal has a frequency equal to that of the received signal. A second signal has a frequency equal to that of the oscillator 14. A third signal has a frequency equal to the sum of the received signal and the first oscillator signal and a fourth signal has a frequency equal to the difference between the received signal and the first oscillator signal. The third signal is passed through a bandpass filter 15 which is designed to filter out all signals having a frequency lower than that of either the first oscillator frequency or the anticipated received signal whichever is greater. In the actual design of the system, the frequency of the first oscillator signal is in the order of 10 times that of the anticipated received signal. Therefore, the bandpass filter 15 is designed to filter out signals having a frequency equal to or less than that of the first oscillator 14.

The output of bandpass filter 15 is fed to an amplifier 16 which amplifies the signal and passes it to a converter 17. The signal passed through bandpass filter 15 is mixed in converter 17 with a signal from a second oscillator 18 having a frequency $f_2$ which is less than the frequency of the first oscillator 14 by the desired doppler frequency shift.

Converter 17 generates signals having four frequencies. One signal has a frequency equal to that of the frequency of the signal passed through bandpass filter 15. A second signal has a frequency $f_2$ equal to that of the frequency of the second oscillator 18. A third signal has a frequency equal to the sum of the two signals and a fourth signal has a frequency equal to the difference between the two signals. The lowest frequency signal generated by converter 17 has a frequency equal to that of the signal passed through bandpass filter 15 minus the frequency of second oscillator 18. Since as was stated above, the signal passed through bandpass filter 15 has a frequency equal to that of the received signal plus that of the first oscillator 14, the lowest frequency signal generated by converter 17 has a frequency equal to that of the received signal plus that of first oscillator 14 minus that of second oscillator 18. Since the frequency of the second oscillator differs from that of the first oscillator by the desired doppler shift, the frequency of this lowest frequency signal is equal to that of the received signal plus the desired doppler shift.

The outputs of converter 17 are fed to low pass filter 19. In the actual design of the system, the frequency of the second oscillator is in the order of magnitude of ten times that of the received signal. Therefore, in order to attenuate all signals except for this lowest frequency signal, the low pass filter 19 must be designed to filter out all signals having frequencies equal to or greater than that of the first oscillator or the second oscillator whichever is the lesser.

The output of a noise generator 20 is mixed with a signal passed through low pass filter 19 to simulate machinery and propeller noise of the target. Therefore, the signal generated by low pass filter 19 has a frequency equal to the frequency to the signal received by receiver 10 plus that of first oscillator 14 minus that of second oscillator 18 plus noise generated by noise generator 20. This signal is amplified by power amplifier 21 and passed to transmitter 22 which transmits the signal back to the sonar system.

In order to more clearly describe the manner in which the present embodiment of the invention performs its function, an example of the operation of the system including specific frequency values and circuit parameters will be illustrated. It is assumed that the signal received by receiver 10, $f_r$, has a frequency of 35 kilohertz and it is desired to increase the frequency of the signal by 510 hertz which represents the shift in frequency of a signal reflected from a target moving at 20 knots away from the radar unit. Accordingly, the frequency of first oscillator 14, $f_1$, is chosen to be 460.510 kilohertz and the frequency of second oscillator 18, $f_2$, is 460.000 kilohertz. The bandpass of bandpass filter 15 is 60 kilohertz centered at 500 kilohertz. Low pass filter 19 is designed to filter out all signals having frequencies higher than 70 kilohertz. When a signal received by receiver 10 from the target having a frequency $f_r$ is mixed with a signal from first oscillator 14 having a frequency equal to $f_1$, signals having the following four frequencies are generated:

$f_r = 35$ khz
$f_1 = 460.510$ khz
$f_r + f_1 = 495.510$ khz
$f_r - f_1 = 425.510$ khz Since bandpass filter 15 passes only signals having frequencies between 470 kilohertz and 530 kilohertz, only the signal having a frequency equal to that of the received signal plus that of the first oscillator signal, that being the 495.510 kilohertz signal, is passed through bandpass filter 15 to converter 17. This signal is mixed with the output signal of second oscillator 18 having a frequency $f_2$ equal to 460 kilohertz to generate signals having the following four frequencies:

$f_r + f_1 = 495.510$ khz
$f_2 = 460.000$ khz
$(f_r + f_1) + f_2 = 955.510$ khz
$(f_r + f_1) - f_2 = 35.510$ khz Since lowpass filter 19 attenuates all signals having frequencies higher than 70 kilohertz, only the signal having a frequency equal to that of the frequency of the received signal plus the frequency of the first oscillator 14 minus the frequency of second oscillator 18 is passed through low pass filter 19. This signal in this case has a frequency of 35.510 kilohertz which is the frequency of the received signal plus the desired doppler frequency shift. This signal is retransmitted by transmitter 22 from the target simulator back to the sonar unit.

Thus, it is seen that the frequency of any received signal in the order of 10–60 kilohertz can be shifted by any of the desired frequency to simulate a doppler shift by simply adjusting the frequency of the first oscillator with respect to that of the second oscillator without requiring the changing of filters to accommodate signals of different frequencies throughout this range.

It will be apparent to anyone having ordinary skill in the art in view of the above discussion that the above-described embodiment of the present invention can be adapted to decrease the frequency of the received signal to simulate a target moving at a negative velocity with respect to the sonar system. This could be accomplished by simply making the frequency of oscillator 18 greater than that of oscillator 14 by the desired frequency shift.

Obviously many modifications and variations of the present invention are possible in the light of the above teachings. It is therefore to be understood that within the scope of the appended claims the invention may be practiced otherwise than as specifically described.

What is claimed is:

1. A sonar target simulator comprising
    a receiver for receiving sonar signals;
    first circuit means coupled to said receiver for generating signals having a frequency equal to the sum of the frequency of the received signal plus that of a first predetermined frequency signal;
    first filter means having broad band pass capability connected to said first circuit means;
    second circuit means connected to said first filter means for generating signals having a frequency equal to that of the received signal plus that of the first predetermined frequency minus that of a second predetermined frequency signal independent of said first circuit means;
    second filter means having broad band pass capability connected to said second circuit means; and
    transmitting means connected to said second circuit means for transmitting sonar echo signals.

2. The system as described in claim 1 wherein said first circuit means includes a first converter coupled to said receiver and a first oscillator coupled to said first converter for generating said first predetermined frequency signal and wherein said second circuit means includes a second converter coupled to the output of said first circuit means and a second oscillator for generating said second predetermined frequency signal.

3. The system as described in claim 2 wherein said first filter means filters out all signals from said first circuit means except for those having a frequency equal to the sum of the frequency of the received signal and that of the signal generated by said first oscillator.

4. The system as described in claim 3 wherein said second filter means passes signals having a frequency equal to the sum of the frequency of the signal received by said receiver and that of the signal generated by said first oscillator minus that of the signal generated by said second oscillator.

5. The system as described in claim 4 further comprising a noise generator coupled to said second filter means for simulating propeller and machinery noise.

* * * * *